US00RE36589E

United States Patent [19]

Akamine et al.

[11] E Patent Number: Re. 36,589

[45] Reissued Date of Patent: Feb. 29, 2000

[54] AUDIO DATA RECORDING SYSTEM FOR RECORDING VOICE DATA AS AN OPTICALLY READABLE CODE ON A RECORDING MEDIUM FOR RECORDING STILL IMAGE DATA PHOTOGRAPHED BY A CAMERA

[75] Inventors: Yoshikazu Akamine; Seiichi Wakamatsu, both of Tokyo, Japan

[73] Assignee: Olympus Optical Co., Ltd., Tokyo, Japan

[21] Appl. No.: 09/172,740

[22] Filed: Oct. 14, 1998

Related U.S. Patent Documents

Reissue of:

[64] Patent No.: 5,644,557
Issued: Jul. 1, 1997
Appl. No.: 08/357,938
Filed: Dec. 16, 1994

[30] Foreign Application Priority Data

Dec. 22, 1993 [JP] Japan ..... 5-325366

[51] Int. Cl.[7] ..... G11B 13/00

[52] U.S. Cl. ..... 369/14; 396/315; 348/232; 382/239

[58] Field of Search ..... 369/14, 15, 13; 396/315, 312; 358/335, 342; 360/10.1, 32; 355/218; 382/239, 250, 251, 232; 348/232

[56] References Cited

U.S. PATENT DOCUMENTS

| | | | |
|---|---|---|---|
| 5,161,233 | 11/1992 | Matsuo et al. | 399/136 |
| 5,276,472 | 1/1994 | Bell et al. | 354/76 |
| 5,376,965 | 12/1994 | Nagasaki et al. | 348/232 |
| 5,661,823 | 8/1997 | Yamauchi et al. | 382/239 |

FOREIGN PATENT DOCUMENTS

| | | |
|---|---|---|
| 60-244145 | 12/1985 | Japan . |
| WO94/08314 | 4/1994 | WIPO . |

*Primary Examiner*—Ali Neyzari
*Attorney, Agent, or Firm*—Frishauf, Holtz, Goodman, Langer & Chick, P.C.

[57] ABSTRACT

An audio data recording/reproduction system including an independent, portable camera for respectively recording still image data on a silver salt region of a film and audio data on a magnetic recording region of the film. A silver salt film developing/printing device is provided for developing the still image data recorded in the silver salt region of the film, and for printing the developed still image data on a front surface of a photographic paper as visible data. A conversion device is provided for reproducing the audio data recorded in the magnetic recording region of the film, and for converting the reproduced audio data into an optically readable code. And a recording device is provided for printing the optically readable code produced by the conversion device on a rear surface or a blank section of the front surface of the photographic paper.

55 Claims, 6 Drawing Sheets

AUDIO DATA RECORDING SYSTEM FOR RECORDING VOICE DATA AS AN OPTICALLY READABLE CODE ON A RECORDING MEDIUM FOR RECORDING STILL IMAGE DATA PHOTOGRAPHED BY A CAMERA

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to an audio data recording/reproduction system which records and reproduces audio data such as voice data. More specifically, the present invention relates to the recording/reproduction of audio data in an optically readable format.

2. Description of the Related Art

Conventionally, various types of media for recording voice data, music data and the like are known. Such known media include a magnetic tape and an optical disk.

However, with these media, the unit cost cannot be reduced very much even if a great amount of copies are prepared, and a large area is required to store such media.

In the case where a medium on which voice is recorded has to be delivered to a person in a remote place, much time and labor can be required.

In order to solve such a problem, there has been proposed a technique in which audio data is recorded on a sheet of paper in the form of image data which can be transmitted by facsimile and copied in large numbers.

An example of such technique is disclosed in, for example, Jap. Pat. Appln. KOKAI Publication No. 60-244145, and according to this publication, audio data is converted into image data by converting some audio data into an optical code.

Further, the following audio data recording/reproduction system and a recording medium used therefor, have been proposed in International Application PCT/JP93/01377 of the assignee of the present application. According to this document, from a recording medium on which multi media information including audio data such as voice, video data obtained from a video camera or the like and digital code data or the like is recorded in the form of optically readable dot code, the dot code is optically read, and a portion to be converted back to the multi media information is stored in a portable box. Thus, the multi media information can be reproduced from the recording medium regardless of place or number of reproductions, making it possible to use a recording medium on which the multi media information including audio data is recorded for a long time.

Further, recently, there has been known an image/voice recording device which uses a recording medium having a recording memory region on a silver salt film, capable of recording image data on a silver salt region and recording audio data on a magnetic recording region. In the conventional system which uses such an image/audio recording device, the image data recorded on the silver salt film is printed on the surface of a photographic paper, and the audio data is stored in another recording medium as a magnetic recording medium.

However, in the printing system in which image data recorded on a silver salt film is printed on the surface of photographic paper and audio data is stored on a magnetic recording medium, each photograph and each magnetic recording medium are separated from each other, and the reproduction of the audio data on the magnetic recording medium and the maintenance of the medium are time-and-labor consuming after adhering each photograph on an album or the like. Further, the audio data on the magnetic recording media are deteriorated as the number of times of reading is increased, and as a result, the audio data are degraded along with time.

SUMMARY OF THE INVENTION

The present invention has been proposed in consideration of the above-described circumstances, and an object thereof is to provide an audio data recording/reproduction system capable of maintaining both audio data and an image, and preventing a degradation of the audio data with time.

Another object of the present invention is to provide an audio data recording/reproduction system using an electronic camera, capable of maintaining both audio data and an image, and preventing a degradation of the audio data with time.

In order to achieve one of the above-described objects, there is provided an audio data recording/reproduction system comprising: image formation means for forming image data recorded on a first recording medium capable of magnetic recording of audio data, on a second recording medium as visualized data, while recording the image data; conversion means for converting the audio data recorded on the first recording medium into an optically readable code; and recording means for printing out the optically readable code converted by the conversion means in an image data unformed region of the second recording medium.

In order to achieve the other of the abovedescribed objects, there is provided an audio data recording/reproduction system comprising: image pick-up means for obtaining image data; input means for inputting audio data; an electronic still camera for recording the image data and the audio data on a first recording medium; image formation means for forming the image data recorded on the first recording medium, or the image data from the image pick-up means on a second recording medium as visualized data; conversion means for converting the audio data recorded on the first recording medium or the audio data from the input means into an optically readable code; and recording means for printing out the optically readable code converted by the conversion means in an image data unformed region of the second recording medium.

More specifically, according to an audio data recording/reproduction system of the present invention, the image formation means forms image data recorded on the first recording medium on which audio data can be magnetically recorded, on a sheet as the second recording medium, i.e., printing out the image data on photographic paper, together with the recording of image data on, for example, a silver salt film having a magnetic recording region. Meanwhile, the audio data magnetically recorded on the first recording medium is converted into an optically readable code by the conversion means, and the optical readable code is printed out in a region of the above paper in which the image data is not printed, for example, the rear surface.

According to another audio data recording/reproduction system, the electronic camera having the imaging means for obtaining image data and the first recording medium for recording the image data obtained by the imaging means, is provided with input means for inputting audio data such that the audio data can be recorded on the first recording medium. The image data recorded on the first recording medium by the image formation means is formed on a sheet serving as the second recording medium. At the same time, the audio data recorded on the first recording means is converted into an optically readable code by the conversion means, and the optically readable code is printed out in a region of the sheet serving as the second recording medium, in which the image data is not formed by the recording means.

The optically readable code printed on the sheet is optically read by the reproduction means, and is reproduced as the original audio data.

Additional objects and advantages of the invention will be set forth in the description which follows, and in part will be obvious from the description, or may be leaned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

Figure 1:
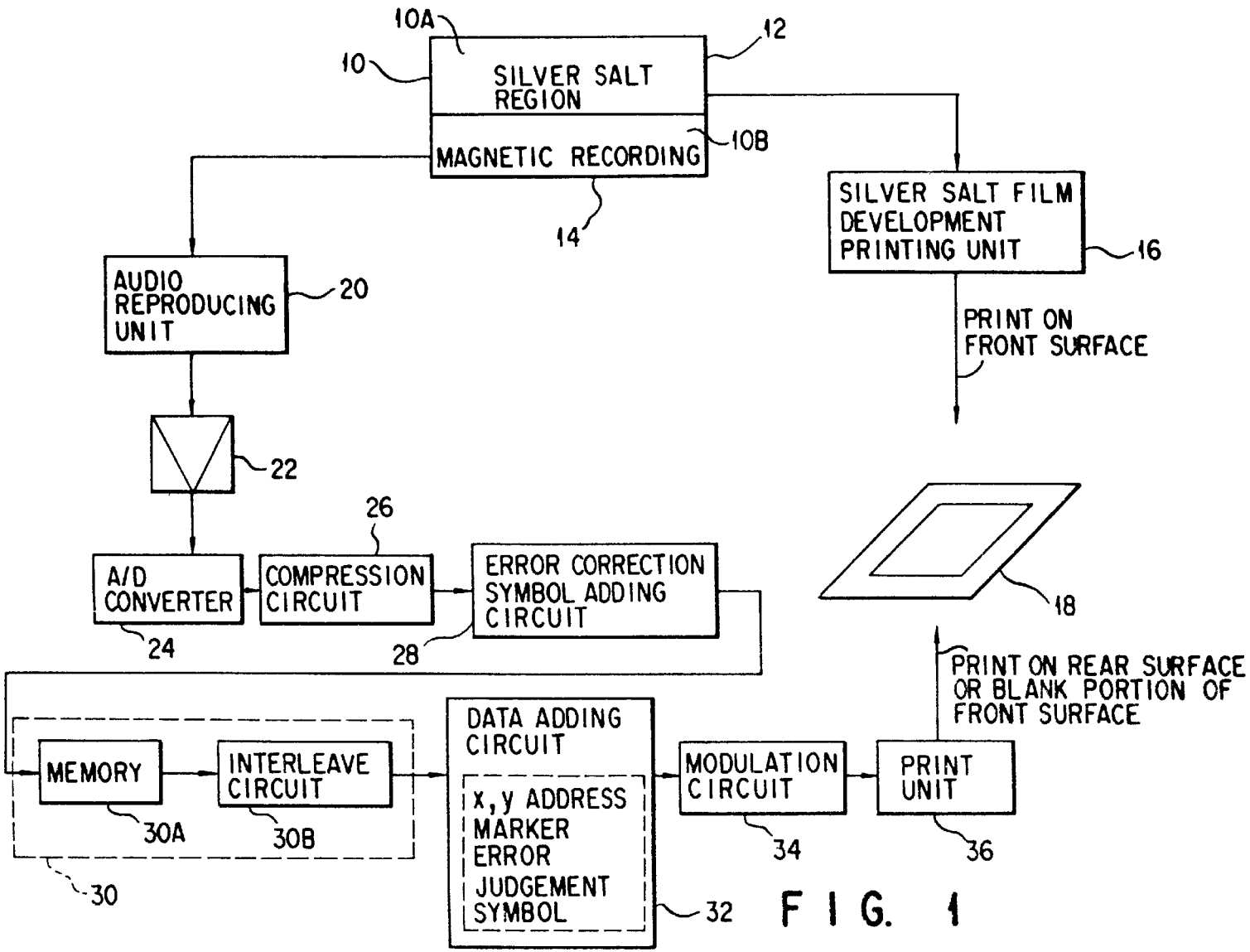
FIG. 1 is a block diagram showing the structure of the first embodiment.

Reference will now be made in detail to the presently preferred embodiments of the invention as illustrated in the accompanying drawings, in which like reference characters designate like or corresponding parts throughout the several drawings.

Embodiments of the present invention will now be described with reference to accompanying drawings.

First Embodiment

FIG. 1 is a diagram showing the structure of the first embodiment of the present invention.

Still image data 12 is recorded in a silver salt region 10A of a silver salt film 10 having a magnetic recording region, which is the first recording medium, and audio data 14 around (before and after) the time of imaging is recorded in a magnetic recording region 10B, both by a conventional camera capable of magnetic recording.

In an audio data recording reproduction system of this embodiment, the still image data 12 is read out from the silver salt region 10A of the silver salt film 10 having the magnetic recording region and printed on the front surface of a photographic paper 18 by a conventional silver salt film development/printing device 16.

When the still image data 12 is printed, an audio reproducing unit 20 reproduces magnetically recorded audio data 14 from the magnetic recording region 10B of the silver salt film 10 having the magnetic recording region. The audio data 14 reproduced by the audio reproducing unit 20 is amplified by a preamplifier 22, and converted into a digital signal by an analog/digital (A/D) converter 24. The digitized audio signal is subjected to data compression by a compression circuit 26, and then an error correction symbol is added to the signal by an error correction symbol adding circuit 28.

After that, the signal is subjected to interleaving by a memory circuit 30. In the interleaving, the data array is two-dimensionally dispersed in advance in accordance with a certain regulation. However, a burst-like contamination or damage of paper, that is, an error itself, is also dispersed, and the error correction and the interpolation of data cannot be easily carried out when the data is set back to the original array by the reproducing device. In the actual interleaving operation, data recorded in a memory 30A is appropriately read out and output by an interleave circuit 30B.

To each block of the output data of the interleave circuit 30B, a marker as a reference for synchronizing and positioning, an x address and a y address, which indicate a two-dimensional address of each block, and an error judgment symbol are added by a data adding circuit 32 in accordance with a predetermined recording format, which will be described in detail later. After that, the output data is demodulated by a demodulation circuit 34 for the purpose of recording. The result is printed on the rear surface or blank portion of the front surface of the photographic paper 18 by a print unit 36.

Figure 2D:
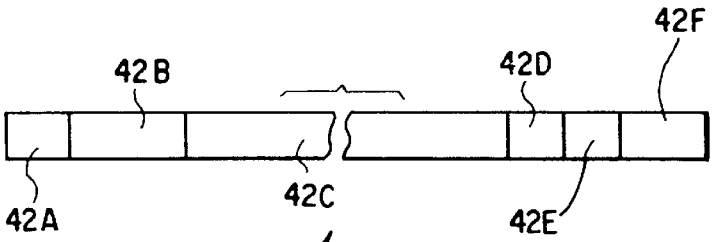
FIGS. 2A, 2B, 2C and 2D are diagrams illustrating the recording results in the first embodiment, with FIG. 2C showing an enlarged view of the small circled portion in FIG. 2B, and FIG. 2D showing a part of FIG. 2C.
Figure 2E:
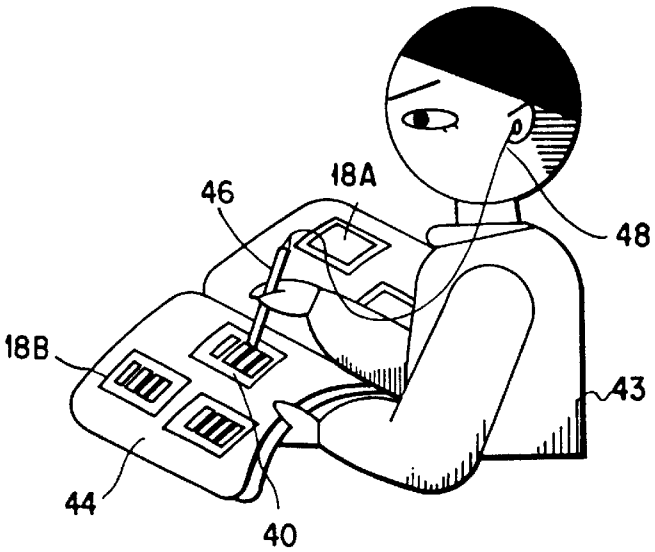
FIG. 2E is a diagram showing a scene in which the read out of data is carried out with the first embodiment.
Figure 2C:
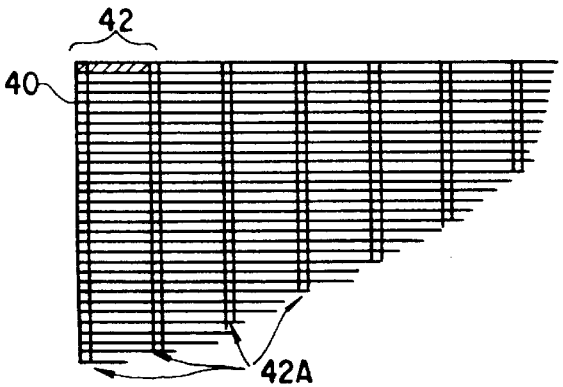
Figure 2A:
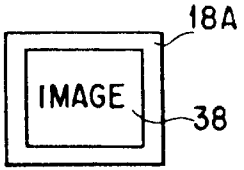
Figure 2B:
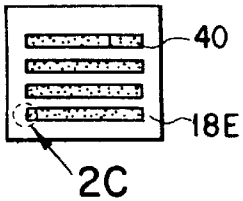

The printing is carried out in the formats such as illustrated in FIGS. 2A and 2B, on the front surface 18A and the rear surface 18B of the photographic paper 18. More specifically, an image 38 is printed on the front surface 18A of the photographic paper 18, and digitized audio data is printed on the rear surface 18B of the photographic paper 18 as recording data 40. The recording data 40 consists of a plurality of blocks 42 as shown in FIG. 2C. Each block 42 includes a marker 42A, an error correction symbol 42B, audio data 42C, x address data 42D, y address data 42E and an error judgment symbol 42F as shown in FIG. 2D. The marker 42A has a pattern which is not usually output in recording modulation, such as used in DAT (digital audio tape recorder). The error correction symbol 42B is used for correcting an error in the audio data 42C. The x and y address data 42D and 42E indicate the position of the block 42. The error judgment symbol 42F are used for error judgment of the x and y address.

The recording data 40 having the above-described format is printed on a sheet of paper by the print unit 36 in such a manner that data of "1" is presented by the presence of a black dot and data of "0" is presented by the absence of a black dot as in, for example, bar code.

FIG. 2E illustrates a scene in which a user 43 is reading out the audio recording data 40 recorded on the rear surface 18B of the photographic paper 18 shown in FIG. 2B with a pen-type reproduction device 46, while the photographic paper is contained in an album 44 of such a transparent bag that both the front surface 18A and the rear surface 18B can be seen. As the recording data 40 is scanned by the pen-type reproduction device 46 shown in FIG. 2E, the recording data 40 is detected, and converted into sounds, which can be heard by the user 43 with an audio output device 48 such as an ear phone. The details of the pen-type reproduction device 46 will be described later.

The recording data 40 such as audio data may not be printed on the rear surface 18B of the photographic paper 18; but may be printed in an area of the front surface 18A, wherein no image data is formed.

Second Embodiment

In the first embodiment, the silver salt film 10 having the magnetic recording region 10B is used as a recording medium. However, even with a type in which both audio data and image data are magnetically recorded by an electronic camera or the like, the image data may be recorded on the front surface of a print sheet and the audio data, after converting it into an optically readable code, may be printed on the rear surface thereof, or in an image data unformed region of the front surface, when the data are actually printed out in accordance with the audio data recording/reproduction system.

Such a case will now be described as the second embodiment of the present invention.

Figure 3:
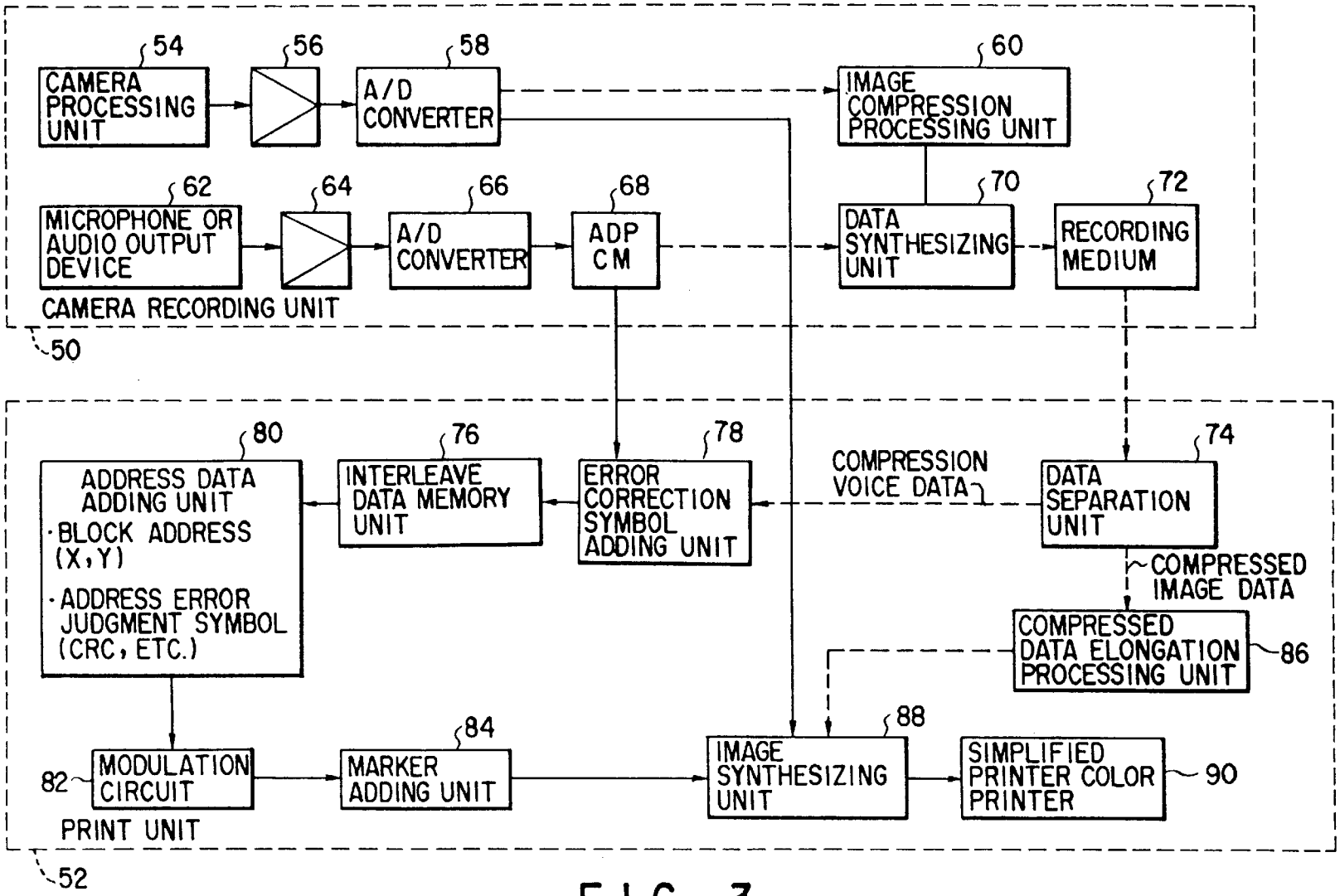
FIG. 3 is a block diagram showing the structure of the second embodiment.

FIG. 3 is a block structure diagram showing an audio data recording/reproduction system consisting of a camera recording unit 50 including an interface with a microphone or an audio output device, and capable of recording audio data, together with image data, on a recording medium such as a memory card, and a print unit 52 capable of printing out the audio data, together with the image data, by a printer or the like. The camera recording unit 50 and the print unit 52 are separably connected to each other. The image recording unit 50 can be used as an electronic camera by itself; however it may be constructed as an integrated unit.

First, the case where the camera recording unit 50 and the print unit 52 are separable from each other will be described.

Image data input by the camera processing unit 54 is amplified by a preamplifier 56 and A/D-converted by an A/D converter 58, and then supplied to an image compression processing unit 60 as indicated by the broken line in the figure. In the image compression processing unit 60, a simple data compression may be carried out in accordance with a natural image compression standard such as JPEG (joint photographic coding experts group). However, it is also a possibility that an optimum data compression process is carried out in the following manner. That is, for example, an image area judgment and separation circuit which functions based on the mode of identified image area separation, using a neural network such as disclosed in U.S. Ser. No. 08/123,533 of the assignee of the present invention, is provided so as to identify if inputted image data is a digitized image such as a handwritten character or a graph, or a multivalued image such as a natural image, and separating the data into these categories. Then, the binary image data is subjected to the binary compression such as MR (modified READ)/MH (modified Hoffman)/MMR (modified modified READ), and the multivalued image data is subjected to the compression based on the compressing function for still image, such as JPEG.

In the meantime, the audio data is input from the microphone or the audio output device 62 around the time of, or after the picking up of image data, and the audio data is amplified by the preamplifier 64 and converted into digital data by the A/D converter 66. Then, the data is supplied to an ADPCM (adaptive differential pulse code modulation) circuit 68. The ADPCM circuit 68 modulates the input digital audio data based on the adaptive differential PCM, so as to compress the data. The audio data compressed by the ADPCM circuit 68 is supplied to a data synthesizing unit 70 as indicated by the broken line in the figure.

In the data synthesizing unit 70, the audio data compressed by the ADPCM circuit 68 and the image data compressed by an image compression processing unit 60 are synthesized into a data format which can be separated by a data separation unit 74, described later, and the synthesized format is stored in a first recording medium 72 such as a memory card.

The recording medium 72 such as a memory card, in which the audio data around the time of, or after the shooting of image is stored together with the image data by the camera recording unit 50, is treated by the data separation unit 74 in the print unit 52 such that the compressed image data and the compressed image data are separated from the predetermined format, and the compressed audio data is input to a data memory unit 76, after error correction symbols are added by an error correction symbol adding unit 78 as indicated by the broken line in FIG. 3. In the data memory unit 76, data items are recorded, and then the data items are subjected to an interleaving process. In the interleaving process, a continuous data array is dispersed to positions appropriately away from each other in order to enhance the correctability by reducing errors as much as possible when the data is actually recorded as a dot code and the dot code is reproduced, for example, suppressing a block error due to noise or the like, as much as possible. More specifically, a burst error is reduced to the level of a bit error so as to decrease the degree of danger by the interleaving process.

To the interleaved data, the address of the block and an address error identification judgment symbol (CRC) are added, and the result is input to a modulation circuit 82. In the modulation circuit 82, for example, 8-bit data is converted into data having another bit number, for example, 10-bit data by 8–10 modulation. In the case of, for example, the 8–10 modulation, there are 1024 possible combinations; however 8 of 10 bits, that is, 256 combinations are selected for assignment.

After that, a marker is formed in a marker adding unit 84 by using a data array which is not included in the 256 data arrays assigned by the modulation circuit 82, and the marker is added to the data. It is possible that the modulation is carried out after the addition of the marker. However, if the marker is added after the modulation, the marker is also modulated, and therefore the marker becomes very difficult to be identified as a marker. By adding the marker after the modulation, the just-mentioned problem can be avoided.

The compressed image data separated by the data separation unit 74 is supplied to an image elongation processing unit 86 as indicated by the broken line in the figure, and subjected to the elongation process which corresponds to the process of the image compression processing unit 60, thus restoring the original image. The restored image is supplied to an image synthesizing unit 88 as indicated by a broken line in the figure.

Figure 4A:
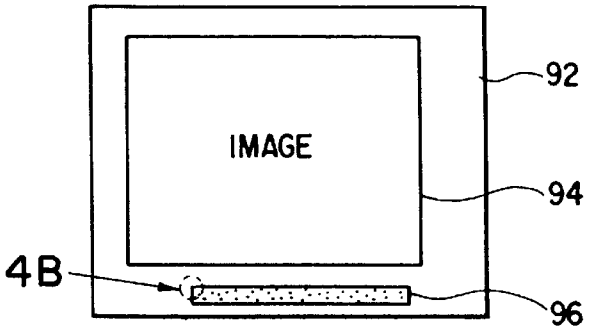
FIGS. 4A, 4B and 4C are diagrams illustrating the recording results in the second embodiment, with FIG. 4B showing an enlarged view of the small circled portion in FIG. 4A, and FIG. 4C showing a part of FIG. 4B.

The image data restored by the image elongation processing unit 86 and the marker-added data from the marker adding unit 84 are synthesized by the image synthesizing unit 88. The synthesized data is printed as a dot code 96 along with an image 94 on a sheet 92 as a second recording medium, which is, for example, heat sensitive paper or photographic paper, sheet paper, tape, or resin film, by a simple printer or a color printer 90 as can be seen in FIG. 4A.

Next, the case where the camera recording unit 50 and a print unit 52 in FIG. 3 are connected to each other will be described.

Image data input from the camera processing unit 54 is amplified by the preamplifier 56 and A/D-converted by the A/D converter 58, and then supplied to the image synthesizing unit 88 as indicated by the solid line in the figure.

In the meantime, the audio data is input from the 10 microphone or the audio output device 62 around the time of, or after the picking up of image data, and the audio data is supplied to the preamplifier 64, the A/D converter 66, and the ADPCM circuit 68 and is then input into the error correction symbol adding unit of the print unit 52, as indicated by the solid line. The data is, as described before, subjected to the addition of error correction code, the interleaving process, the addition of error identification judgment symbol for the address of a block, or address itself (cyclic redundancy code: CRC or the like), the modulation, and the addition of a marker, respectively, by the error correction symbol adding unit 78, the interleave data memory unit 76, the address data adding unit 80, the modulation circuit 82 and the marker adding unit 84, and then the data is supplied to the image synthesizing unit 88.

In the image synthesizing unit 88, the image data input from the A/D converter 58 of the camera recording unit 50 and the marker-added data from the marker adding unit 84 are synthesized, and the synthesized data is printed as the dot code 96 along with the image 94 on the sheet 92 as the second recording medium, which is, for example, heat sensitive paper or photographic paper, sheet paper, tape, or resin film, by the simple printer and the color printer 90 as can be seen in FIG. 4A.

Figure 4B:
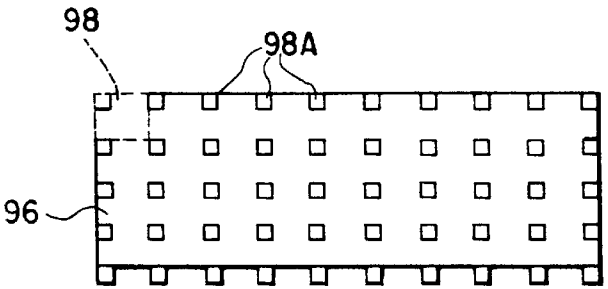

The concept of the dot code in this embodiment will now be described with reference to FIGS. 4B, 4C and 4E. According to the data format of the dot code of this embodiment, one block 98 consists of a marker 98A, a data area 98B in which actual data is input, a block address 98C of the block 98 and address error detection and correction data 98D. A number of blocks 98 each having the just-mentioned constitution are two-dimensionally arranged in horizontal and vertical direction, and collected as the form of the dot code 96.

Figure 4D:
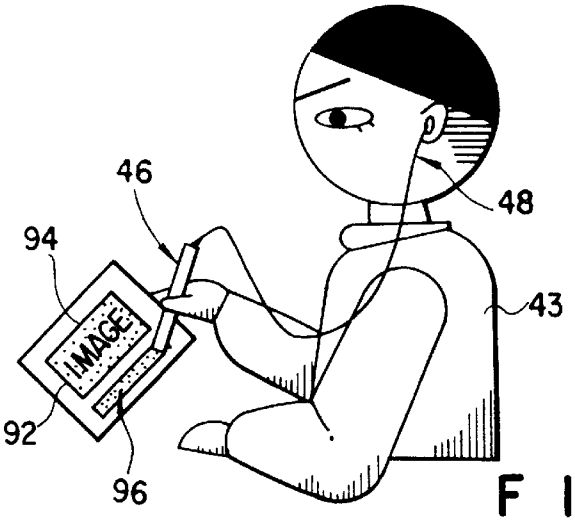
FIG. 4D is a diagram showing a scene in which the read out of data is carried out with the second embodiment.
Figure 4C:
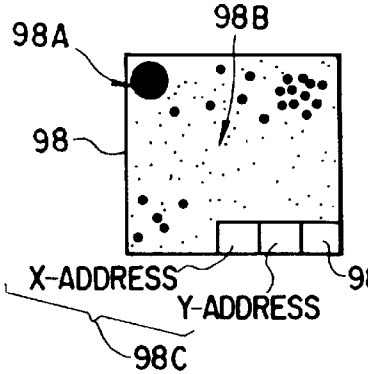
Figure 4E:
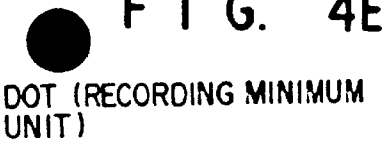
FIG. 4E shows an enlarged view of a dot, which is a minimum recording unit.

FIG. 4D illustrates a scene in which a user 43 is scanning the dot code 96 formed in an image data unformed region on the sheet 92 with the pen-type reproducing device 46, thus reproducing the data through the audio output device 48 such as earphone.

Figure 5:
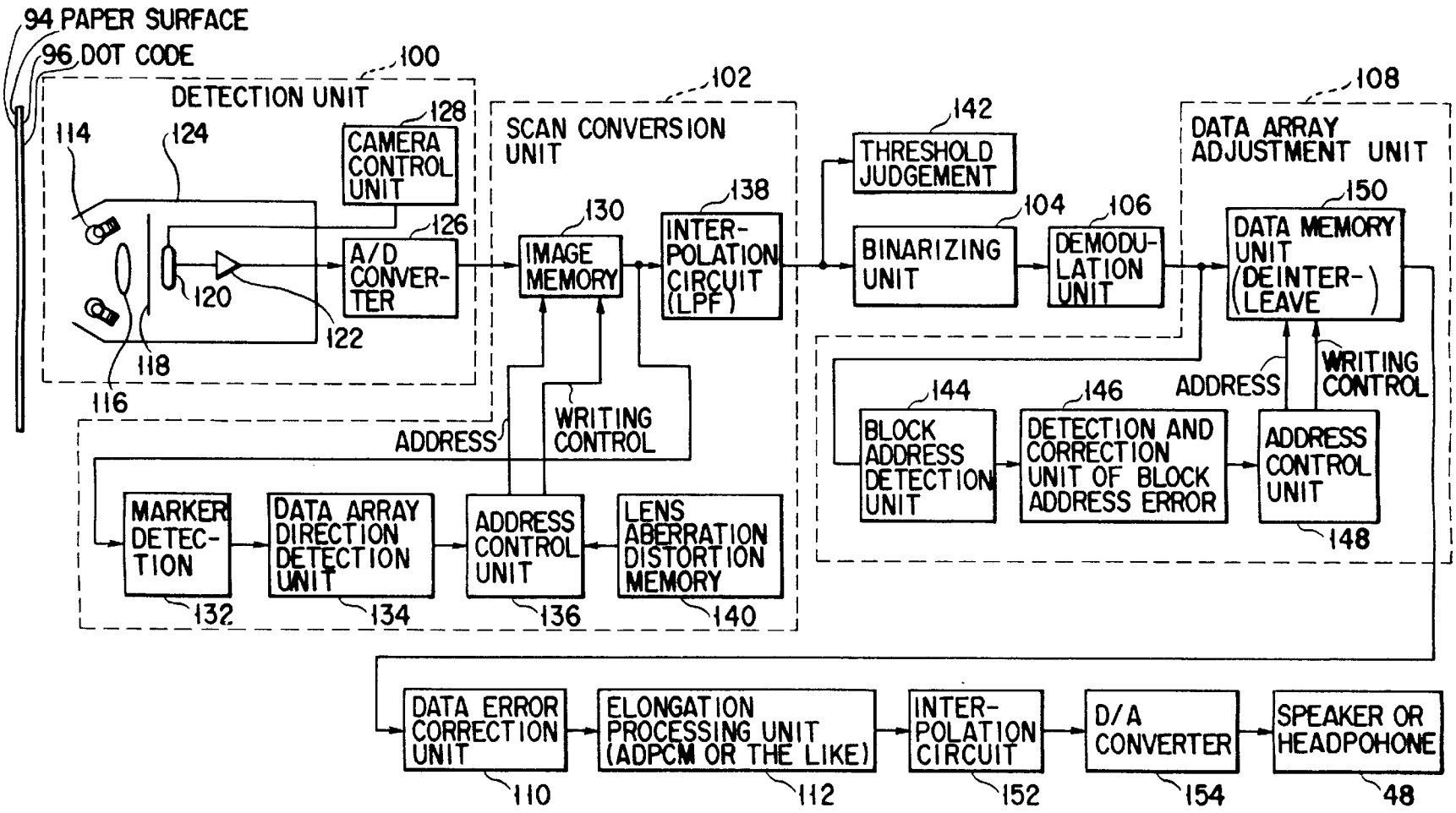
FIG. 5 is a block diagram showing the structure of a pen-type data reproduction device used in the present invention.

The structure of the pen-type reproducing apparatus 46 is discussed in International Patent Application PCT/JP93/01377 of the assignee of the present application in detail; however the structure will be briefly described with reference to FIG. 5 for reference.

The pen-type reproducing device comprises a detection unit 100 for reading out a dot code printed on a sheet 92, a scan-conversion unit 102 for identifying image data supplied from the detection unit 100 as a dot code and performing normalization; a binarization processing unit 104 for binarizing multivalued data, a demodulation unit 106, a data array adjusting unit 108 for adjusting a data array, a data error correction unit 110 for correcting a read-our error and a data error at the time of reproduction, an elongation processing unit 112 with respect to the data compression process in the ADPCM circuit 68, the audio output device 48, and the like.

In the detection unit 100, the dot code on the sheet 92 is lit up by the light source 114, and the reflection light is guided through an image forming system 116 such as a lens and a space filter for removing moire or the like. Then, the reflection light is detected as an image signal by a camera unit 120 such as a charge coupled device (CCD) or a charge modulating device (CMD) which converts optical data into an electric signal, and the detected signal is amplified and output by the preamplifier 122. The light source 114, the image forming system 116, the space filter 118, the camera unit 120 and the preamplifier 122 are enclosed in an external light shut off unit 124 designed for avoiding turbulence with respect to the external light. The image signal amplified by the preamplifier 122 is converted into digital data by the A/D converter 126, and then supplied to the next stage, i.e. the scan-conversion unit 102.

The camera unit 120 is controlled by the camera control unit 128. For example, in the case where a CCD of the interline transfer type is used as the camera unit 120, the camera control unit 128 outputs, as a control signal for the camera unit, a vertical (V) blanking signal for vertical synchronism, an imaging element reset pulse signal for resetting a data charge, a charge transfer gate pulse signal for transferring a charge accumulated in charge transfer accumulating units two-dimensionally arranged, to a plurality of vertical shift registers, a horizontal charge transfer clock (CLK) signal which is a transfer clock signal of a horizontal shift register for transferring the charge in the horizontal direction and outputting it to outside, a vertical charge transfer pulse signal for transferring the charges of the vertical shift registers in the vertical direction and send them to the horizontal shift resister and the like. The timings for these signals are shown in FIG. 6.

The camera control unit 128 applies a light-emitting cell control pulse for timing the light emission of the light source 114, in accordance with the timings.

Figure 6:
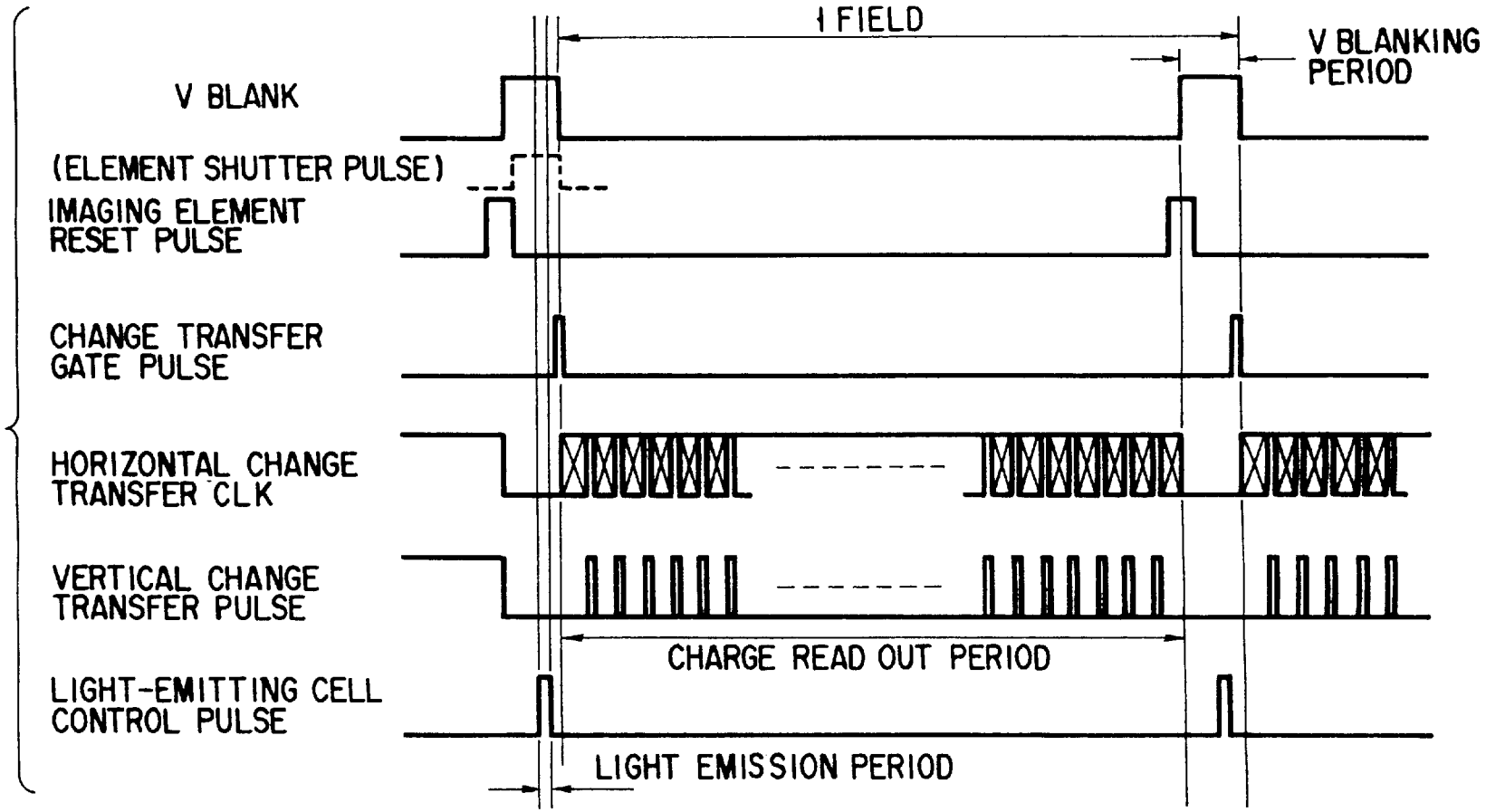
FIG. 6 is a timing chart of the light emission of the pen-type data reproduction device shown in FIG. 5.

FIG. 6 shows, basically, a conceptual timing chart for one field. The image data is read out between a V blanking and another V blanking on the one field. The light source 114 is turned on not continuously, but pulsewise, and the following pulse lighting is carried out in synchronous with the unit field. In this case, the timing is controlled such that the exposure is carried out during a v blanking period, that is, while no image charge is output, thus avoiding a clock noise which is generated by the pulse lighting, from entering a signal output. More specifically, the light-emitting cell control pulse is a very fine digital clock pulse generated by applying an instantaneous electrical power, and therefore it is necessary to avoid the noise caused by the application of the power from entering an analog image signal. In order to achieve this, the light source is turned on pulsewise during a V blanking. Thus, the signal to noise (S/N) ratio is improved. By turning the light source pulsewise, the time of light emission is shortened, and therefore the influence of out-of-focus by a manual operation error and a transfer error can be removed. Consequently, a high-speed scanning can be performed.

In the case where some turbulence such as external light enters the inside the external light shut off unit 124 as the reproducing device 46 inclines, the image signal is reset by outputting a reset pulse once immediately before turning on the light source 114 during a v blanking period so as to suppress the S/N degradation to the lowest level, and light is emitted immediately after that. Further, the reading of data is carried out immediately after that.

The scan-conversion unit 102 will now be described with reference to, one again, FIG. 5. The scanconversion 102 identifies the image data supplied from the detection unit 100 as a dot code, and carries out the normalization in the following manner. That is, the image data from the detection unit 100 is stored in the image memory 130, and then, the data is read out from the memory to send it to the marker detection unit 132. In the marker detection unit 132, the marker of each block is detected. The data arrangement direction detection unit 134 detects the arrangement direction of the data, such as the rotating direction or inclining direction, by using the marker. The address control unit 136 reads out the image data from the image memory 130 so as to correct the data based on the results of the above detection, and supplies the data to the interpolation circuit 138. At the same time, lens aberration data is read out from the memory 140 in which the data used for correcting lens aberration distortion in the image forming optical system 116 of the detection unit 100, and the correction of the lens is also carried out. The interpolation circuit 138 interpolates the image data so as to convert it into data having the original dot code pattern.

The output of the interpolation circuit 138 is applied to the binarizing unit 104. As can be understood from FIG. 4C, the dot code 96 has black and white patterns, and is basically digital data. The dot code is digitalized by the binarizing unit 140. During the digitization, the threshold judgment circuit 142 is used to carry out appropriate judgments of the threshold for accurate digitization, in consideration of influences of a turbulence, signal amplification and the like. Then, the data, which was modulated by the modulation circuit 82 as described with reference to FIG. 3, is demodulated by the demodulation unit 106, and the data is input to the data array adjusting unit 108.

In the data array adjusting unit 108, the block address of the two-dimensional blocks described before, is detected by the block address detection unit 144. After that, the error detection and correction of the block address is carried out by the block address error detection and correction unit 146. Then, the data is stored in the data memory 150 in the unit of block by the address control unit 148.

Since the data items are stored in the units of block address, they can be stored efficiently even if some data is left out or added in the middle of a series.

Next, the data read out from the data memory 150 is subjected to the data correction in the data error correction unit 110. The output from this error correction unit 108 is then subjected to the elongation process in the elongation processing unit 112, in reply to the data compression by the ADPCM circuit 68 shown in FIG. 8. Further, the output data is interpolated by the data interpolation circuit 152, and this interpolation is correctable. The output data from the data interpolation circuit 152 is converted into an analog signal by the (digital/analog) D/A converter 154, and output to the audio output device 48 such as a speaker, a headphone or an earphone.

As described above, according to the present invention, an audio data recording/reproduction system capable of handling both audio data and an image, and capable of preserving the audio data DO as not to be degraded with time, can be provided.

Further, according to the present invention, an audio data recording/reproduction system using an electronic camera, capable of handling audio data and an image, and capable of preserving the audio data DO as not to be degraded along with time, can be provided. More specifically, image data recorded on a silver salt film is printed on the surface of a photographic paper, and at the same time, audio data recorded in a magnetic recording region of the silver film is printed on the rear surface of the photographic paper or in a blank area of the surface, in an optically readable form. Therefore, even if the photograph is already stuck on an album, the audio data which is associated with the photograph can be easily reproduced a pen-type reproduction device. Thus, the photograph and its sound can be preserved along with each other, and therefore maintenance is facilitated. Further, since the audio data as recording data is optically read out, the data is not deteriorated regardless of how many times it is read out, and is not degraded with time. Furthermore, the rear surface or the like of a photographic paper is a blank area which is not conventionally used for any purpose, and therefore, with the technique of the present invention for adding audio data to the conventional image data, the usability of photography can be expanded.

Moreover, according to the present invention, the audio data recording function can be added to an electronic camera, and with such a device, a recorded image is printed on a print-out sheet and audio data recorded on a memory card is printed out on the rear surface of the sheet or a blank area of the front surface as an optically readable dot code. Thus, the same effect as described above can be obtained. Further, with the technique of the present invention, a memory card can be used for recording audio and image data and both types of data can be recorded and printed on a sheet, expanding the utility of the card and sheet, and audio data memo can be easily added to image data at low cost even in the case where a black-and-white image only is printed out using a heat sensitive paper.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. An audio data recording/reproduction system comprising:

an independent, portable camera for respectively recording still image data on a silver salt region of a film and audio data on a magnetic recording region of said film;

a silver salt film developing/printing device for developing said still image data recorded in said silver salt region of said film, and for printing said developed still image data on a front surface of a photographic paper as visible data;

conversion means for [reproducing] *converting* said audio data recorded in said magnetic recording region of said film, [and for converting said reproduced audio data] into an optically readable *two-dimensional* code *comprising a plurality of blocks*; and a recording device for printing said optically readable *two-dimensional* code produced by said conversion means on a rear surface or a [blank] *predetermined* section of said front surface of said photographic paper.

2. An audio data recording/reproduction system according to claim 1, further comprising reproduction means for optically reading out said optically readable *two-dimensional* code printed by said recording device on said photographic paper, and for reproducing corresponding original audio data therefrom.

3. An audio data recording/reproduction system according to claim 1, wherein said conversion means comprises:

magnetic recording/reproduction means for reproducing said audio data magnetically recorded on said magnetic recording region of said film;

A/D conversion means for converting said audio data reproduced by said magnetic recording/reproduction means into a digital signal;

compression means for compressing said digital signal produced by said A/D conversion means;

error correction symbol adding means for adding an error correction symbol to said digital signal compressed by said compression means;

memory means for interleaving said digital signal to which said error correction symbol has been added by said error correction symbol adding means;

data adding means for adding predetermined data to said digital signal interleaved by said memory means; and modulation means for modulating said digital signal to which said predetermined data has been added by said data adding means, for recording thereof.

4. An audio data recording/reproduction system according to claim 3, wherein said data adding means includes:

means for adding [a two-dimensional] block [address marker] *addresses* to respective blocks of said digital signal interleaved by said memory means[, said two-dimensional address marker serving as a reference for synchronizing and positioning said blocks of said digital signal interleaved by said memory means]; and means for adding an error judgment signal *for said block address* to said digital signal interleaved by said memory means[in accordance with a predetermined recording format].

5. An audio data recording/reproduction system according to claim 1, wherein said recording device prints said optically readable *two-dimensional* code as a dot code constructed by two-dimensionally arranging a plurality of dots.

6. An audio data recording/reproduction system according to claim 2, wherein said reproducing means includes a pen-type reproduction device for scanning said optically readable *two-dimensional* code and converting said optically readable code into an audio signal.

7. An audio data recording/reproduction system comprising:

an independent, portable electronic still camera including image pick-up means for obtaining image data, input means for inputting audio data, and a first recording medium for recording said image data obtained by said image pick-up means and said audio data input by said input means;

a printer for printing one of said image data recorded on said first recording medium and said image data obtained by said image pick-up means on a second recording medium as visualized data; and conversion means for converting one of said audio data recorded on said first recording medium and said audio data input by said input means into an optically readable *two-dimensional* code *comprising a plurality of blocks*;

wherein said printer prints said optically readable code produced by said conversion means in a *predetermined* region of said second recording medium in which image data has not been printed.

8. An audio data recording/reproduction system according to claim 7, further comprising reproduction means for optically reading out said optical readable *two-dimensional* code recorded on said second recording medium so as to reproduce corresponding original audio data.

9. An audio data recording/reproduction system according to claim 7, wherein said image pick-up means comprises:

a camera unit for inputting an image signal;

an A/D converter for converting said image signal input by said camera unit into a digital signal; and a compression unit for compressing said [image] digital *image* signal produced by said A/D converter.

10. An audio data recording/reproduction system according to claim [9] 7, wherein said input means comprises:

an input unit for inputting an audio signal;

an A/D converter for converting said image signal input by said input unit into a digital signal; and a compression unit for compressing said audio digital signal produced by said A/D converter.

11. An audio data recording/reproduction system according to claim [10] 7, wherein said electronic still camera includes a data synthesizing unit for synthesizing compressed image data produced by said compression unit of said image pick-up means and compressed audio data produced by said compression unit of said input means.

12. An audio data recording/reproduction system according to claim 11, wherein synthesized image data and audio data produced by said data synthesizing unit are recorded on said first recording medium.

13. An audio data recording/reproduction system according to claim 12, wherein said first recording medium includes a memory card.

14. An audio data recording/reproduction system according to claim [12] 7, wherein said conversion means comprises:

[a data memory unit for storing one of said audio data produced by said compression unit of said input means and said audio data recorded in said first recording means, and for interleaving said stored audio data;]

an error correction symbol adding unit for adding an error correction symbol to said [interleaved] audio data *from one of a compression unit included in said input means and said first recording medium;*

*a data memory unit for recording said audio data to which the error correction symbol is added by said error correction symbol adding unit, and for interleaving said recorded audio data*;

an address data adding unit for adding respective *block* address data to respective blocks of said audio data [to which said error correction symbol has been added] *which is interleaved by said data memory unit*, and for adding an address error judgment symbol to said audio data [to which said error correction symbol has been added] *which is interleaved by said data memory unit*;

[a conversion circuit for converting] *a modulating circuit for modulating* said audio data to which said *block* address data and said address error judgment symbol [have been into data of another bit number] *are* added *by said address data adding unit, for recording*; and a marker adding unit for adding a marker to said *modulated* audio data[of another bit number].

15. An audio data recording/reproduction system according to claim [17] 7, further comprising synthesizing means for synthesizing one of said image data recorded on said first recording medium and said image data obtained by said image pick-up means with said optically readable *two-dimensional* code produced by said conversion means, and wherein a synthesized output from said synthesizing means is recorded on said second recording medium by said printer.

16. An audio data recording/reproduction system according to claim 7, wherein said printer includes a simple printer and a color printer.

17. An audio data recording/reproduction system according to claim 7, wherein said second recording medium comprises one of a heat sensitive paper, photographic paper, photographic sheet, photographic tape, and resin film.

18. An audio data recording/reproduction system according to claim 15, further comprising:

data separation means for separating said audio data recorded on said first recording means and said image data recorded on said first recording means from each other; and elongation means for elongating said image data separated by said data separation means to form elongated, uncompressed data, and for supplying said elongated, uncompressed data to said synthesizing means.

*19. An audio data recording/reproduction system comprising:*

*digital image data obtaining means for obtaining an imaged picture as digital image data;*

*digital audio data obtaining means for obtaining an input voice as digital audio data;*

*a memory for recording digital image data obtained by said digital image data obtaining means and digital audio data obtained by said digital audio data obtaining means;*

*conversion means for converting said digital audio data recorded in said memory or audio data from said digital audio data obtaining means into an optically readable two-dimensional code comprising a plurality of blocks; and*

*recording means for forming image data recorded in said memory or image data from said digital image data obtaining means as visualized data on a recording medium, and printing/recording an optically readable two-dimensional code converted by said conversion means on said recording medium.*

*20. An audio data recording/reproducing system according to claim 19, wherein said recording means prints/records said optically readable two-dimensional code on a region in said recording medium where image data is not formed.*

*21. A recording method of recording an image and a voice on the same recording medium comprising the steps of:*

*obtaining image data by image a picture;*

*obtaining audio data by inputting a voice;*

*converting audio data obtained in said audio data obtaining step into an optically readable two-dimensional code comprising a plurality of blocks; and*

*forming image data obtained in said image data obtaining step on a recording medium as visualized data, and printing/recording an optically readable two-dimensional code converted in said converting step on said recording medium.*

*22. A method according to claim 21 wherein:*

*said image data obtaining step records a picture imaged by a camera using a silver salt film having a silver salt region and a magnetic recording region in said silver salt region of said silver salt film as a still image;*

*said audio data obtaining step records a voice inputted to said camera on said magnetic recording region of said silver salt film as audio data;*

*said converting step converts said audio data recorded in said magnetic recording region into said two-dimensional code; and*

*said recording step records a still image recorded on said silver salt region on a front surface of a photographic paper, and printing/recording said optically readable two-dimensional code on a predetermined section on which a still image recorded on a rear surface or a front surface of said photographic paper is not recorded.*

*23. A method according to claim 21 wherein:*

*said image data obtaining step obtains a still image imaged by an electronic still camera as digital image data and recording the still image in a memory installed in said electronic still camera;*

*said converting step converts said digital audio data recorded in said memory into an optically readable two-dimensional code comprising a plurality of blocks; and*

*said recording step records said digital image data recorded in said memory on a front surface of a recording medium, and prints/records said optically readable two-dimensional code on a predetermined section on which a still image recorded on a rear surface or a front surface of said recording medium is not recorded.*

*24. An audio data recording/reproduction system according to claim 1, wherein said plurality of blocks of said optically readable two-dimensional code are arranged in two dimensions.*

*25. An audio data recording/reproduction system according to claim 24, wherein each of said plurality of blocks has a two-dimensional block addresses.*

*26. An audio data recording/reproduction system according to claim 25, wherein each said two-dimensional block address includes an address error judgment symbol.*

*27. An audio data recording/reproduction system according to claim 1, wherein each of said plurality of blocks includes a marker.*

*28. An audio data recording/reproduction system according to claim 1, wherein each of said plurality of blocks has a data area comprising a plurality of dots arranged according to said audio data.*

*29. An audio data recording/reproduction system according to claim 28, wherein said plurality of dots are arranged in two dimensions according to a predetermined format.*

*30. An audio data recording/reproduction system according to claim 1, wherein said optically readable two-dimensional code is produced by subjecting individually said plurality of blocks to conversion processing.*

*31. An audio data recording/reproduction system according to claim 1, wherein said plurality of blocks of said optically readable two-dimensional code are arranged in two dimensions, each of said plurality of blocks having a two-dimensional block address, a marker, and a data area comprising a plurality of dots arranged according to said audio data.*

*32. An audio data recording/reproduction system according to claim 7, wherein said plurality of blocks of said optically readable two-dimensional code are arranged in two dimensions.*

*33. An audio data recording/reproduction system according to claim 32, wherein each of said plurality of blocks has a two-dimensional block address.*

*34. An audio data recording/reproduction system according to claim 33, wherein each said two-dimensional block address includes an address error judgment symbol.*

*35. An audio data recording/reproduction system according to claim 7, wherein each of said plurality of blocks includes a marker.*

*36. An audio data recording/reproduction system according to claim 7, wherein each of said plurality of blocks has*

*a data area comprising a plurality of dots arranged according to audio data.*

*37. An audio data recording/reproduction system according to claim 36, wherein said plurality of dots are arranged according to a predetermined format.*

*38. An audio data recording/reproduction system according to claim 1, wherein said optically readable two-dimensional code is produced by subjecting individually said plurality of blocks to conversion processing.*

*39. An audio data recording/reproduction system according to claim 7, wherein said plurality of blocks of said optically readable two-dimensional code are arranged in two dimensions, each of said plurality of blocks having a two-dimensional block address, a marker, and a data area comprising a plurality of dots arranged according to said audio data.*

*40. An audio data recording/reproduction system according to claim 19, wherein said plurality of blocks of said optically readable two-dimensional code are arranged in two dimensions.*

*41. An audio data recording/reproduction system according to claim 40, wherein each of said plurality of blocks has a two-dimensional block address.*

*42. An audio data recording/reproduction system according to claim 41, wherein each said two-dimensional block address includes an address error judgment symbol.*

*43. An audio data recording/reproduction system according to claim 19, wherein each of said plurality of blocks includes a marker.*

*44. An audio data recording/reproduction system according to claim 19, wherein each of said plurality of blocks has a data area comprising a plurality of dots arranged according to audio data.*

*45. An audio data recording/reproduction system according to claim 44, wherein said plurality of dots are arranged in two dimensions according to a predetermined format.*

*46. An audio data recording/reproduction system according to claim 19, wherein said optically readable two-dimensional code is produced by subjecting individually said plurality of blocks to conversion processing.*

*47. An audio data recording/reproduction system according to claim 19, wherein said plurality of blocks of said optically readable two-dimensional code are arranged in two dimensions, each of said plurality of blocks having a two-dimensional block address, a marker, and a data area comprising a plurality of dots arranged according to said audio data.*

*48. An audio data recording/reproduction system according to claim 21, wherein said plurality of blocks of said optically readable two-dimensional code are arranged in two dimensions.*

*49. An audio data recording/reproduction system according to claim 48, wherein each of said plurality of blocks has a two-dimensional block address.*

*50. An audio data recording/reproduction system according to claim 49, wherein each said two-dimensional block address includes an address error judgment symbol.*

*51. An audio data recording/reproduction system according to claim 21, wherein each of said plurality of blocks includes a marker.*

*52. An audio data recording/reproduction system according to claim 21, wherein each of said plurality of blocks has a data area comprising a plurality of dots arranged according to said audio data.*

*53. An audio data recording/reproduction system according to claim 52, wherein said plurality of dots are arranged in two dimensions according to a predetermined format.*

*54. An audio data recording/reproduction system according to claim 21, wherein said optically readable two-dimensional code is produced by subjecting individually said plurality of blocks to conversion processing.*

*55. An audio data recording/reproduction system according to claim 21, wherein said plurality of blocks of said optically readable two-dimensional code are arranged in two dimensions, each of said plurality of blocks having a two-dimensional block address, a marker, and a data area comprising a plurality of dots arranged according to said audio data.*

* * * * *